Figure 1:
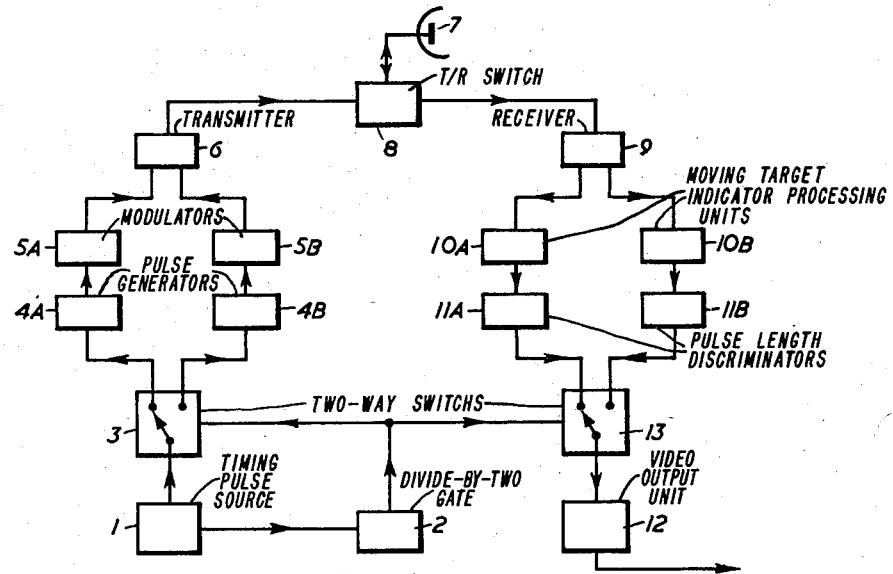

Sept. 15, 1964    F. W. KIME    3,149,331
PULSED RADAR SYSTEMS
Filed May 10, 1961

INVENTOR
Frederick William Kime
BY Baldwin & Wright
ATTORNEYS

United States Patent Office
3,149,331
Patented Sept. 15, 1964

3,149,331
PULSED RADAR SYSTEMS
Frederick William Kime, Great Baddow, England,
 assignor to The Marconi Company Limited, London, England, a British company
Filed May 10, 1961, Ser. No. 109,482
Claims priority, application Great Britain,
May 18, 1960, 17,546/60
5 Claims. (Cl. 343—17.1)

This invention relates to pulsed radar systems and has for its object to provide improved pulsed radar systems which shall be to a large extent free of the operating defect generally known as "second trace returns."

An operating defect which is serious in many pulsed radar systems, especially high power systems of high data rate, is that of second trace returns. Consider the case of a high power, high data rate pulsed radar system of given nominal range and pulse repetition frequency and capable of detecting quite small reflecting targets within that range. If a transmitted pulse from such a system encounters a good reflecting target outside the nominal range—e.g. a large, high flying aircraft—the reflected radio echo will reach the radar receiver at a time later than the end of the normal radar range time base and will be displayed during the next time base excursion or even, in some cases, during a still later time base excursion. This particular target will, accordingly, be displayed at a very much shorter range than in fact it is. Such target echoes, coming back to a radar station after the end of the normal radar range time base, are known as "second trace returns" and are a serious cause of confusion and misinformation in pulsed radar systems, especially those of high power. Although it is possible to reduce confusion by second trace returns by reducing the radar pulse repetition frequency and therefore increasing the range beyond which a second trace target must be, this solution of the problem is, in general, not acceptable because reduction of the radar pulse repetition rate is, of course, accompanied by corresponding reduction in the data rate.

According to this invention in its broadest aspect a pulsed radar system comprises means for transmitting successively different mutually distinguishable pulses in a predetermined periodically repeated sequence of sucessively different pulses; means for receiving the transmitted pulses after reflection by targets encountered thereby; means for separating the sucessively different received signal pulses of each sequence in different ones of a corresponding number of signal channels; and means for switching the outputs of the different channels in turn to echo signal utilisation means, each said channel being switched to said utilisation means for a time period not exceeding the time interval between the transmission of the distinguishable pulse to which that channel is appropriate and the transmission of the next pulse in the sequence.

In the preferred and simplest embodiments of the invention the pulses are transmitted at a fixed predetermined pulse transmission frequency so that each sequence of successively different mutually distinguishable pulses repeats itself at a sequence repetition frequency equal to the pulse transmission frequency divided by the number of different distinguishable pulses in each sequence.

Preferably the successively different mutually distinguishable pulses in each sequence are of different duration (i.e. length) so as to be mutually distinguishable by their different durations.

Theoretically the invention is not limited to the use of any particular number of successively different mutually distinguishable pulses in a sequence. In practice, however, it will generally be sufficient to have only two different pulses in a sequence and this is preferred for reasons of simplicity.

The transmitting equipment of a radar system in accordance with this invention may comprise a plurality of separate pulse generators, each providing a different one of the pulses in a sequence, and each controlling an independent modulator modulating a single transmitter proper. Alternatively, however, there may be a single modulator modulating the transmitter proper and means for controlling said modulator to cause it differently and distinguishably to modulate the transmitter proper in each successive modulating operation.

Figure 2:
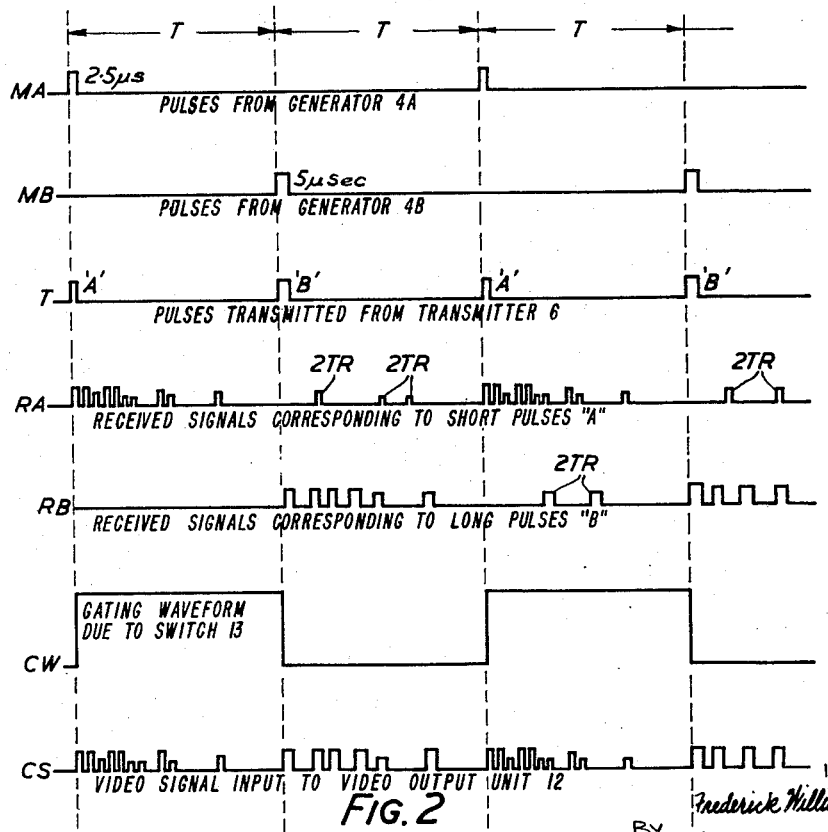

The invention is illustrated in the accompanying drawing in which FIGURE 1 is a block diagram of one embodiment and FIGURE 2 is an explanatory graphical figure.

Referring to FIGURE 1, 1 is a master timing pulse source producing periodic pulses with a predetermined pulse transmission period T. Timing pulses from source 1 are fed to what may be regarded as a gating or switch controlling unit 2 which may in practice be any convenient known form of frequency divider such as a bi-stable circuit dividing the frequency from source 1 by the factor 2. Unit 2 controls a gating or switching circuit 3. This circuit is represented for simplicity as though it were a mechanical two-way switch, but in practice it would be any suitable known form of electronic switch or gate. The circuit 3 sends successive pulses from the source 1 alternately to two pulse generators 4A or 4B so that generator 4A is triggered by alternate pulses from source 1 and the generator 4B is triggered by the remaining alternate pulses. Pulse generator 4A produces pulses of one predetermined duration, e.g. 2.5 $\mu$sec., while pulse generator 4B produces pulses of a different predetermined duration, e.g. 5 $\mu$sec. Each pulse generator 4A or 4B feeds into a modulator 5A or 5B, the two modulators controlling a radar transmitter proper 6 which supplies radar pulses to the usual transmitting aerial system represented conventionally at 7 via the usual T-R switch arrangement represented by the block 8. The transmitting part of the illustrated system accordingly sends repeated sequences each of two radar pulses, one pulse of each sequence being of duration 2.5 $\mu$sec. and the other pulse being of duration 5 $\mu$sec. The pulses occur with a repetition transmission pulse period T, successive short pulses occurring at intervals 2T, and successive long pulses also occurring at intervals 2T.

Received radar echoes are fed to a radar receiver 9 of any known suitable form, and the output from this receiver is branched into two channels each consisting of a known moving target indicator (M.T.I.) processing unit followed by a known pulse length discriminator. The M.T.I. units are referenced 10A and 10B and the pulse length discriminators are referenced 11A and 11B. The delay of the delay lines in the known M.T.I. processing units 10A and 10B is 2T in each case since each has to handle pulses occurring at this repetition period. The discriminator 11A is selective of and passes only the shorter pulses of 2.5 $\mu$sec. and the discriminator 11B is selective of and passes only the longer 5 $\mu$sec. pulses. Output from the two channels, which may be termed the "A" and "B" channels, are taken alternately to a video output unit 12 leading to any convenient known echo signal utilisation and display means (not shown) via a gating or switching unit 13 again represented as a mechanical switch and which is actuated by the unit 2. The unit 13, like the unit 3, may be any known suitable form of electronic gating or switching circuit.

The operation of the whole system will be clear from the graphical illustration of FIGURE 2. In this figure line MA shows the pulses produced by the pulse generator 4A and line MB similarly shows the pulses produced by the generator 4B. Line T shows the pulses transmitted by the system, the short pulses being marked "A" and the longer ones "B." Line RA typifies received signals corresponding to the transmitted short "A" pulses. Desired echoes appear in the first and third periods T and second trace returns are indicated as occurring in the second and fourth periods T, these being marked with the reference 2TR. Line RB similarly shows received signals due to the "B" pulses. The desired echoes are in the second and fourth periods T and second trace returns 2TR are shown as occurring in the third period T. Line GW represents the switching or gating waveform due to the action of the unit 13 under the control of the unit 2 and line CS represents the resultant video signals fed in to unit 12. As will be seen the second trace returns have disappeared and only the desired signals remain.

I claim:

1. A pulsed radar system comprising means for transmitting successively different mutually distinguishable pulses in a predetermined periodically repeated sequence of successively different pulses; means for receiving echo signals reflected by targets; pulse length discriminating means for separating the successively different echo signal pulses of each sequence in different ones of a corresponding number of signal channels; echo signal utilisation means; and means for switching the outputs of the different channels in turn to said echo signal utilisation means, each said channel being switched to said utilisation means for a time period not exceeding the time interval between the transmission of the distinguishable pulse to which that channel is appropriate and the transmission of the next pulse in the sequence.

2. A pulsed radar system as claimed in claim 1 wherein said means for transmitting the pulses transmits at a fixed predetermined pulse transmission frequency so that each sequence of successively different mutually distinguishable pulses repeats itself at a sequence repetition frequency equal to the pulse transmission frequency divided by the number of different distinguishable pulses in each sequence.

3. A pulsed radar system as claimed in claim 1 wherein said means for transmitting comprises a plurality of separate pulse generators, each providing a different one of the pulses in a sequence, and each controlling an independent modulator modulating a single transmitter proper.

4. A pulsed radar system as claimed in claim 1 wherein said means for transmitting comprises a transmitter, a single modulator modulating said transmitter and means for controlling said modulator to differently and distinguishably modulate said transmitter in each successive modulating operation.

5. A pulsed radar system as claimed in claim 1 wherein the number of signal channels is two.

References Cited in the file of this patent
UNITED STATES PATENTS

| | | |
|---|---|---|
| 2,817,832 | Mathes | Dec. 24, 1957 |
| 2,943,314 | Rodgers | June 28, 1960 |
| 2,987,720 | Katzin | June 6, 1961 |